US006753757B1

(12) United States Patent
Lerchner et al.

(10) Patent No.: US 6,753,757 B1
(45) Date of Patent: Jun. 22, 2004

(54) ACTUATION DEVICE

(75) Inventors: Leonhard Lerchner, Salzburg (AT); Hermann Hainzlmaier, Geisenfeld (DE)

(73) Assignee: SkiData AG, Gartenau (AT)

( * ) Notice: Subject to any disclaimer, the term of this patent is extended or adjusted under 35 U.S.C. 154(b) by 0 days.

(21) Appl. No.: 09/622,447

(22) PCT Filed: Feb. 16, 1998

(86) PCT No.: PCT/EP98/00870

§ 371 (c)(1),
(2), (4) Date: Dec. 12, 2000

(87) PCT Pub. No.: WO99/41476

PCT Pub. Date: Aug. 19, 1999

(51) Int. Cl.[7] ................................................ G05B 19/00

(52) U.S. Cl. ...................... 340/5.6; 340/5.64; 340/5.66; 340/5.7; 340/5.71; 340/5.72; 340/539.1; 340/539.11; 340/539.23; 340/10.42; 340/5.32; 307/10.5

(58) Field of Search ................................ 340/5.6, 5.64, 340/5.66, 5.7, 5.71, 5.72, 539.1, 539.11, 539.23, 10.42, 5.32; 307/10.5

(56) References Cited

U.S. PATENT DOCUMENTS

| | | | | | |
|---|---|---|---|---|---|
| 4,327,353 | A | * | 4/1982 | Beard et al. | 340/5.3 |
| 4,514,623 | A | | 4/1985 | Baus et al. | 235/482 |
| 5,218,343 | A | * | 6/1993 | Stobbe et al. | 340/573.4 |
| 5,491,471 | A | * | 2/1996 | Stobbe | 340/5.61 |

FOREIGN PATENT DOCUMENTS

| | | |
|---|---|---|
| DE | 195 27 801 | 2/1996 |
| DE | 296 04 598 | 7/1996 |
| EP | 0 267 085 | 5/1988 |
| EP | 0 501 715 | 9/1992 |
| GB | 2 299 613 | 10/1996 |
| WO | WO 92/18732 | 10/1992 |

* cited by examiner

*Primary Examiner*—Michael Horabik
*Assistant Examiner*—Yves DaLencourt
(74) *Attorney, Agent, or Firm*—Flynn, Thiel, Boutell & Tanis, P.C.

(57) ABSTRACT

An actuation device, for example for a door lock, is capable of actuation by a control unit which can be initiated by a transponder reader unit, said control unit being connected to a magnetic signal evaluation unit. The transponder reader unit generates signals which correspond to the signals of a magnetic card read head, for the initiation of the magnetic signal evaluation unit.

9 Claims, 2 Drawing Sheets

ACTUATION DEVICE

FIELD OF THE INVENTION

The invention relates to an actuation device, such as an actuation device that can be used to control a lock.

BACKGROUND OF THE INVENTION

For contact-free actuation, for example of a lock, the principle is known of using a transponder and a transponder reader unit for the actuation of the lock mechanism (DE 196 12 156 A, DE 196 12 157 A, and WO 92 18732 A).

GB 2 299 613 A, discloses another actuation device. This device includes a housing that is formed with a slot. The slot in the housing in this case is designed for the insertion of the card with the transponder, which communicates with the transponder reader unit.

Hotels and similar establishments are nowadays frequently equipped with magnetic card room door locks. To this end, the lock features a housing, in which the electronics of the lock are arranged, consisting of a control unit for the actuation of the mechanical elements of the lock and a magnetic signal evaluation unit, which actuates the control unit. Also provided in the housing is a switch to actuate the electronics of the lock. This switch is actuated by the magnetic card. There is also a read head for the magnetic card. The housing features a slot for the insertion of the magnetic card (EP 0 5-1 715 A1).

The actuation of the known magnetic card hotel locks is somewhat complicated. For example, the card must be inserted in accordance with the reading speed of the magnetic head. If the card is inserted too fast or too slowly, the lock will not open. The card must also be introduced to the read head with the correct side and in the correct direction before the lock will open.

The known magnetic card locks can easily be damaged through the slot in the housing. Thus, the presence of the slot makes it possible for someone to deliberately damage the lock. In addition to this, the module with the read head in the housing is of a size which corresponds to the magnetic card. Consequently, a lock that is dimensioned to accommodate the read head tends to be considerably bulky, at least on one side of the door.

A locking system for key actuation is known from DE 195 27 801 A1 of a different type, i.e. electronic keys for contact-free actuation, as well as magnetic cards.

SUMMARY OF THE INVENTION

The object of the invention is to provide an assembly that can be used to convert an actuation device capable of actuation by magnetic cards, in a simple manner and in an attractive manner from the point of view of design.

Because of the transponder read device, the actuation device according to the invention is capable of contact-free actuation with a transponder. The transponder can, for example, be located on a card or on a key ring, or fitted to a wristwatch.

A preferred assembly according to the invention includes an actuation circuit with a proximity sensor, which detects the approach of the transponder. The proximity sensor may be, for example, an LED sensor, i.e. a reflected light barrier, or a capacitative, inductive, or heat sensor.

The sensor activates the control unit for the actuation device. The control unit, in turn, activates the transponder reader unit, which emits the signals that correspond to the signals which a magnetic card read head emits when reading a valid magnetic card. The signals transmitted by the transponder reader unit are evaluated by a magnetic signal evaluation unit, which is connected to the control unit. The magnetic signal evaluation unit actuates the actuation device.

In addition to this, a display device is provided, such as an LED display, which is actuated by the control unit. The display unit indicates, for example, whether or not the transponder is programmed for the door lock in question.

In order to convert an actuation device, such as a hotel room door lock, from magnetic card actuation to the contact-free actuation according to the invention, all that is required, accordingly, is to replace the module with the actuation switch and the magnetic read head disposed in the housing with a module that includes components of the transponder reader unit and the actuation or stand-by circuit.

The transponder reader unit consists in general of an antenna, an analog section, an RF control unit, and a driver, which is connected to the magnetic evaluation unit.

To convert a hotel room lock, which is capable of actuation by a magnetic card, to the contact-free lock actuation according to the invention, a cover is provided. The cover covers the slot in the door lock housing. The antenna of the transponder reader unit is mounted to the cover. If the door lock housing includes another aperture, the cover can also be applied to this other aperture.

It is also possible for the proximity sensor for the actuation or stand-by circuit to be mounted to the cover.

To write the magnetic cards, a PC is provided for in the hotel, which actuates a magnetic card encoder. This magnetic card encoder may, according to the invention, be replaced by an RF encoder, whereby the RF encoder communicates with the PC with signals which correspond to the signals from a magnetic card. The protocol between the PC and the encoder, i.e. the software, can then be maintained.

BRIEF DESCRIPTION OF THE DRAWINGS

The invention is explained hereinafter in greater detail, on the basis of the drawings wherein.

DETAILED DESCRIPTION

Figure 1:
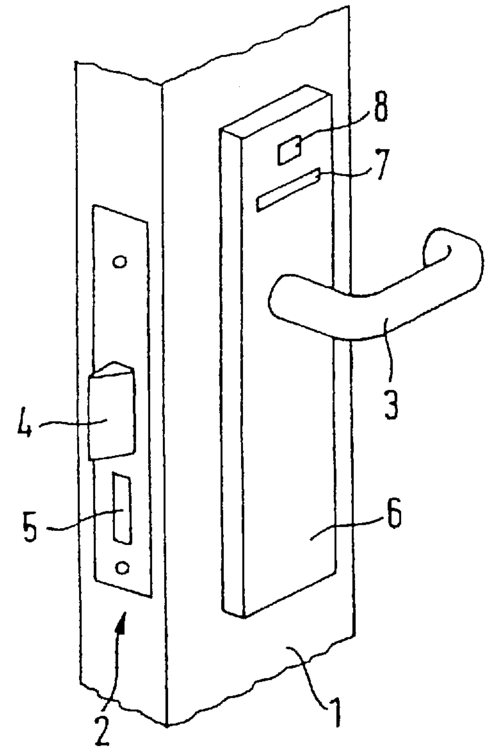
FIG. 1 (PRIOR ART)
FIG. 1 A perspective view of a part of a hotel door with a prior art magnetic card lock according to the invention.

FIG. 1 illustrates a lock 2 with a tongue 4, capable of actuation by the latch 3, and a bolt 5 that is fitted to a door 1. The lock 2 is designed as a conventional magnetic card lock. Lock 2 also includes a lock housing 6 mounted to the door 1. To achieve this, a slot 7 is provided in the lock housing 6, for inserting a magnetic card. The actuation or stand-by circuit, the magnetic read head, and the electronics of the known magnetic card lock are located in the housing 6. An LED display 8 indicates whether or not the lock 2 has been opened by the magnetic card.

Figure 2:
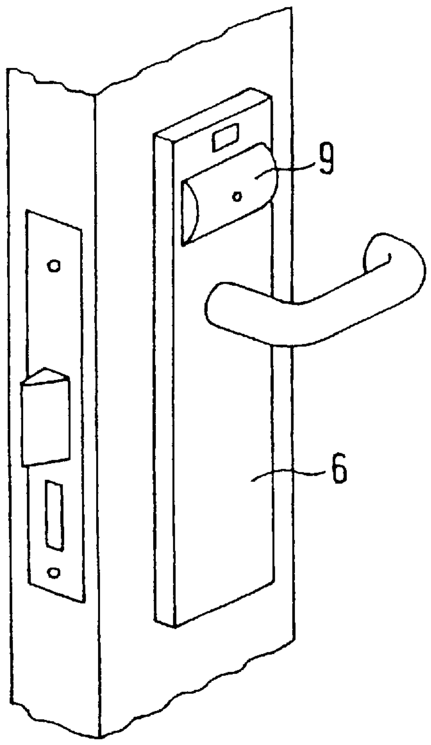
FIG. 2 A perspective view of the door of FIG. 1 after conversion to the contact-free door lock actuation according to the invention.

As seen in FIG. 2, the device according to the invention includes a cover 9 fitted over the slot 7 of the housing 6.

Figure 4:
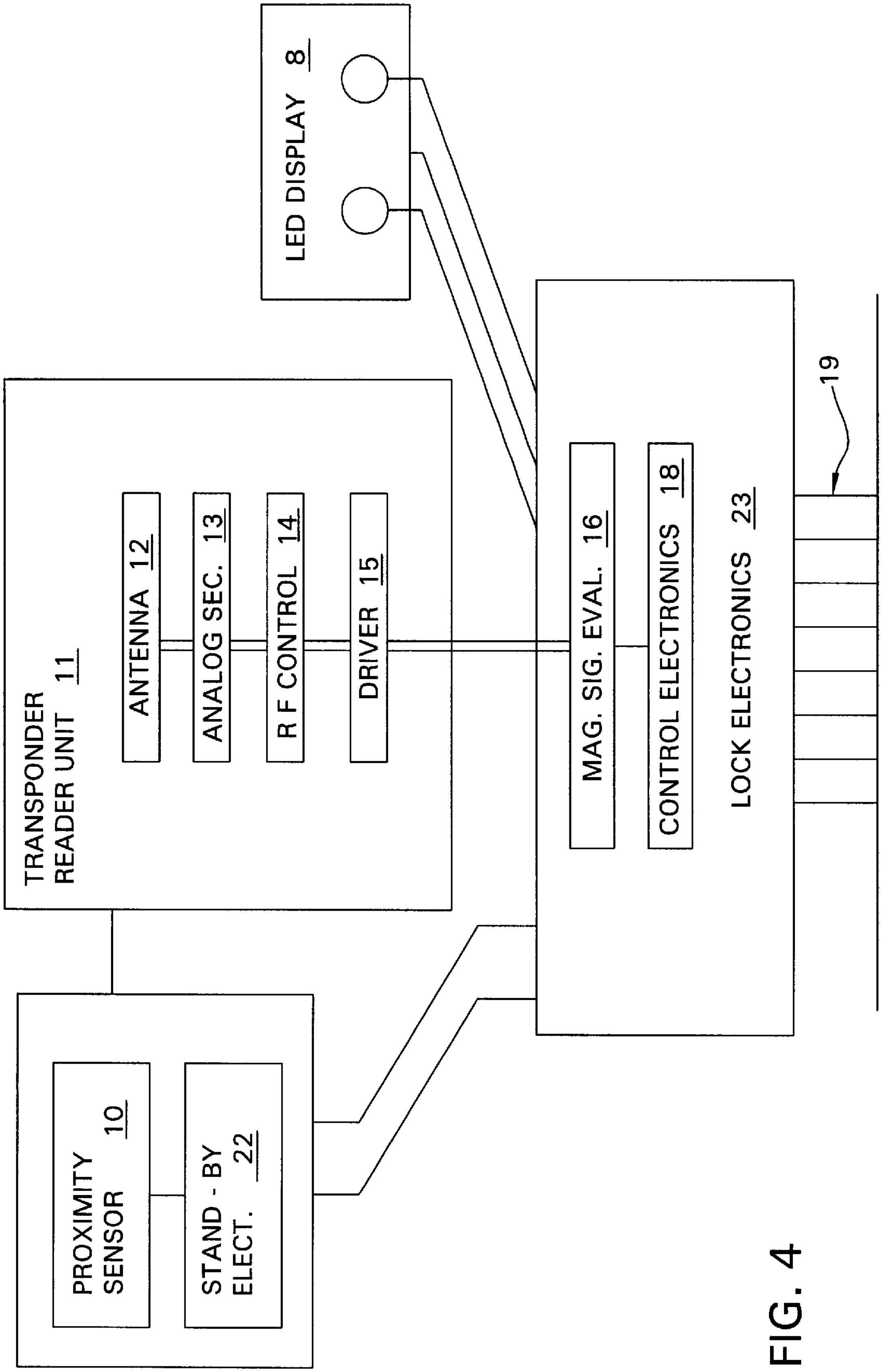
FIG. 4 A circuit for the contact-free door lock actuation according to the invention.

As illustrated in FIG. 4, the device according to the invention includes a proximity sensor 10, which is connected to a transponder reader unit 11. The transponder reader unit 11 comprises an antenna 12, an analog section 13, an RF control unit 14, and a driver 15. The transponder reader unit 11 is designed in such a way that it generates signals which are equivalent with the signals from the magnetic head of the conventional magnetic card lock.

The driver 15 is connected to the magnetic signal evaluation unit 16, to which signals are conducted which correspond to the signals which a magnetic read head produces when a valid magnetic card is introduced.

The magnetic signal evaluation unit 16 controls the operation of a control unit 18. Control unit 18 actuates the mechanical elements 19 of the lock (mechanical elements shown diagrammatically). The magnetic signal evaluation unit 16 and the control unit 18 form the electronics 23 of the lock.

Figure 3:
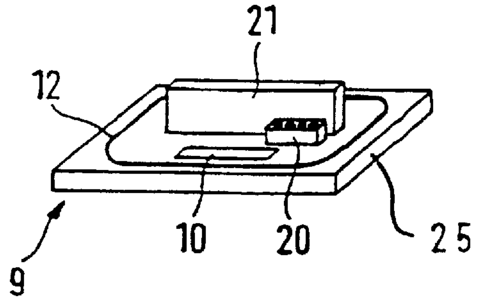
FIG. 3 A perspective reproduction of the cover for the housing slot, taken from the door lock according to FIG. 2.

As seen by FIG. 3, proximity sensor 10, and antenna 12 of the transponder reader unit 11 are mounted to cover 9. A plug 20 for connecting the proximity sensor 10 to the control unit 18 and the antenna 12 to the housing-mounted components of the transponder reader unit 11 is also mounted to cover 9. Plug 20 may also be used to establish a connection between proximity sensor 10 and the housing-mounted components of the transponder unit 11. The cover 9 is also provided with a tongue 21, which is inserted into the slot in the housing 6, in order to secure the cover 9 to the housing 6.

Cover 9 has a head 25 that is attached to and located forward of tongue 21. Head 25 extends over the exposed face of housing 6 that defines slot 7. In the illustrated version of the invention, proximity sensor 10 and antenna 9 are mounted to the cover head 25.

In FIG. 4, 22 designates the actuation or stand-by electronics which, like the LED display 8, are connected to the lock electronics 23.

The actuation device according to the invention is, as indicated heretofore, suitable, for example, for hotel room locks. It can, however, also be used in other areas in which a magnetic card can be replaced by a contact-free transponder card, for example in automatic cash dispensers.

What is claimed is:

1. An actuation device, said actuation device having:

a housing, said housing having a slot for receiving a data-carrying card;

an electronically actuated control unit disposed in said housing for regulating a device;

a signal evaluation unit disposed in said housing for receiving data signals received as a consequence of the reading of a data-carrying card, said signal evaluation unit configured to, based on the received data signals, selectively generate an actuation signal to said control unit to regulate the operation of said control unit;

a cover separate from said housing that is disposed over said housing, said cover positioned over said housing to extend over the housing slot;

a transponder reader unit, said transponder reader unit comprising:

an antenna mounted to said cover to receive signals from a transponder external to said housing and said cover; and a signal processing circuit disposed in said housing and connected to said signal evaluation unit, said signal processing circuit configured to: receive signals from said antenna; convert the signals from said antenna into a form in which said signal evaluation unit can evaluate the signals; and forward the converted signals to said signal evaluation unit; and an electrical connector mounted to said cover, wherein said antenna is connected to said electrical connector and said electrical connector applies the signals from said antenna to said signal processing circuit.

2. The actuation device of claim 1, wherein said transponder reader unit signal processing circuit includes: an analog signal processing unit that exchanges signals with said antenna; an RF control unit that is connected to said analog signal processing unit; and a driver that is connected between said RF control unit and said signal evaluation unit.

3. The actuation device of claim 2, wherein said control unit is configured to selectively displace a lock bolt.

4. The actuation device of claim 1, wherein said control unit is configured to selectively displace a lock bolt.

5. The actuation device of claim 1, wherein:

a stand-by circuit is disposed in said housing; and a proximity sensor is mounted to said cover and is configured to detect the presence of a transponder wherein said proximity sensor is connected to said stand-by circuit to, based on the detected presence of a transponder, control said stand-by circuit.

6. The actuation circuit of claim 5, wherein:

said cover is shaped to have: a tongue that is seated in the slot of said housing; and a head integral with said tongue that is positioned to extend over portions of said housing that define the slot; and said antenna and said proximity sensor are mounted to said cover head.

7. The actuation device of claim 5, wherein said control unit is configured to selectively displace a lock bolt.

8. The actuation circuit of claim 1, wherein: said cover is shaped to have: a tongue that is seated in the slot of said housing; and a head integral with said tongue that is positioned to extend over portions of said housing that define the slot, said antenna being mounted to said cover head.

9. The actuation circuit of claim 1, wherein said electrical connector attached to said cover is a plug.

* * * * *